United States Patent

Huang et al.

(10) Patent No.: US 8,503,113 B2
(45) Date of Patent: Aug. 6, 2013

(54) WIDE-ANGLE RELAY LENS AND IMAGING SYSTEM HAVING SAME

(75) Inventors: Hai-Jo Huang, Taipei Hsien (TW); Fang-Ying Peng, Taipei Hsien (TW); Sheng-An Wang, Taipei Hzien (TW); Xiao-Na Liu, Guangdong (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 292 days.

(21) Appl. No.: 12/962,593

(22) Filed: Dec. 7, 2010

(65) Prior Publication Data

US 2012/0099207 A1    Apr. 26, 2012

(51) Int. Cl.
G02B 9/06    (2006.01)

(52) U.S. Cl.
USPC .......................................................... 359/793

(58) Field of Classification Search
USPC .................. 359/717, 793, 753, 651, 682, 675
See application file for complete search history.

(56) References Cited

U.S. PATENT DOCUMENTS 5,764,426 A * 6/1998 Ohtake ......................... 359/793

OTHER PUBLICATIONS

Klein, Miles V., and Thomas E. Furtak. Optics. New York: Wiley, 1986. 155-162. Print.*

* cited by examiner

*Primary Examiner* — Zachary Wilkes
(74) *Attorney, Agent, or Firm* — Altis Law Group, Inc.

(57) ABSTRACT

A relay lens is used for an imaging system having a main lens. The main lens has a pupil plane. The relay lens, in the order from the subject side to the image side thereof, includes a first lens of negative refractive power, and a second lens of positive refractive power. The first lens has a first principal plane and a second principal plane. The second lens has a third principal plane and a fourth principal plane. The relay lens system satisfies the following formulas: $0.53<|f1/f2|<0.57$; $1.54<v1/v2<3.11$; $0.22<D1/D2<0.65$, where f1 and f2 are the effective focal lengths of the first and second lenses, v1 and v2 are the Abbe numbers of the first and second lenses, D1 is the distance between the second principal plane and the third principal plane, D2 is the distance between the fourth principal plane and the pupil plane.

4 Claims, 10 Drawing Sheets

WIDE-ANGLE RELAY LENS AND IMAGING SYSTEM HAVING SAME

BACKGROUND

1. Technical Field

The present disclosure relates to lenses and, particularly, to a wide-angle relay lens and an imaging system having the wide-angle relay lens.

2. Description of Related Art

If a user wants to capture a wide-angle image the user must use a wide-angle lens. However, cameras having wide-angle lenses are often expensive.

Therefore, it is desirable to provide a wide-angle relay lens and imaging system having the same which can overcome the limitations described.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Embodiments of the present disclosure will now be described in detail with reference to the drawings.

Figure 1:
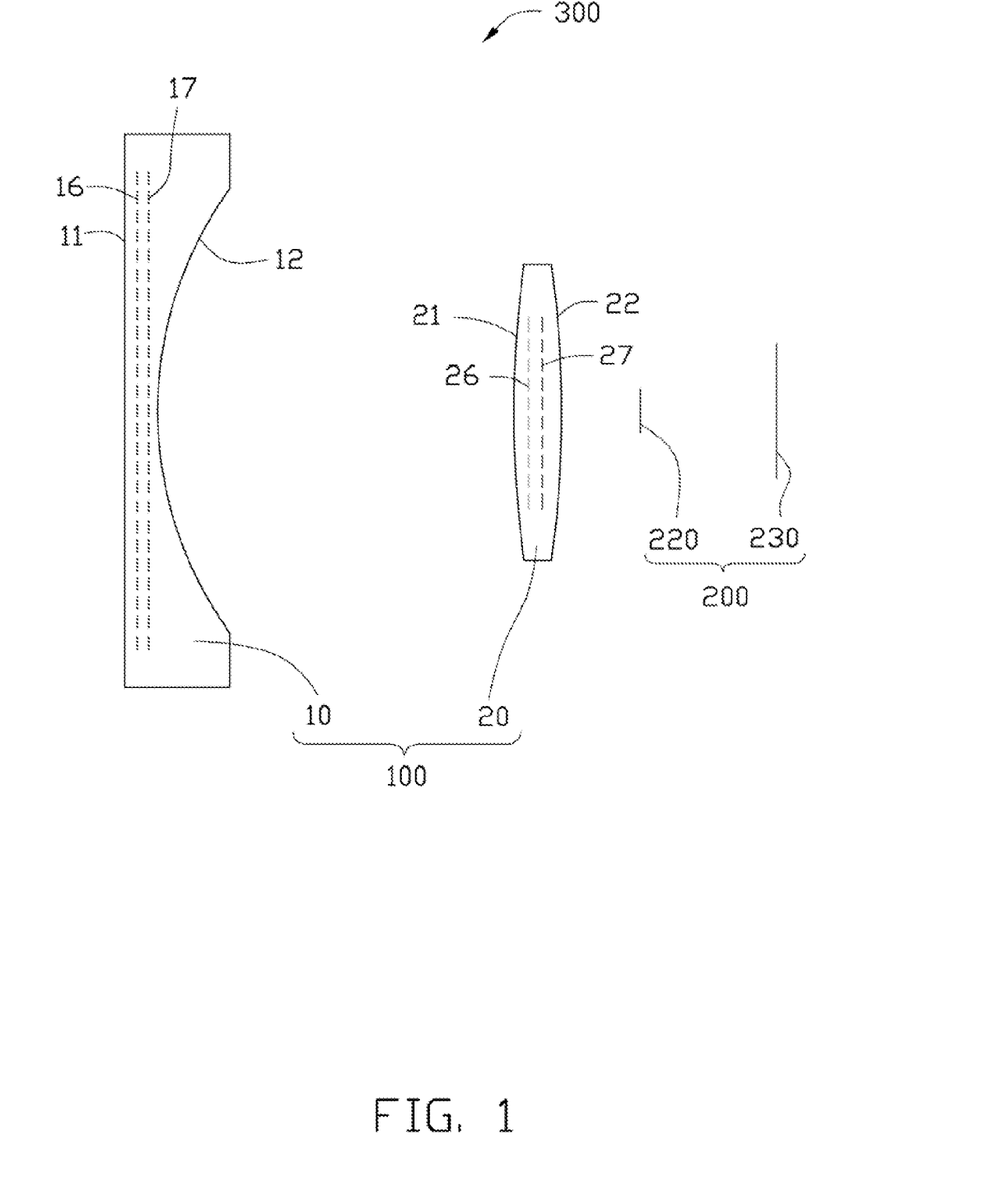
FIG. 1 is a schematic view of an imaging system.

Referring to FIG. 1, an imaging system 300, such as a camera, includes a relay lens 100 and a main lens 200. The main lens 200 is received in the body of the imaging system 300. The relay lens 100 can be detachably attached to the body of the imaging system 300, at the object side of and coaxial to the main lens 200 to form a wide-angle imaging system. The main lens 200 defines a pupil plane 220 and an image plane (or surface) 230 arranged in that order from the subject side to the image side thereof. The pupil plane 220 is a surface through which the light rays enter the main lens 200.

The relay lens 100 includes a first lens 10 of negative refractive power and a second lens 20 of positive refractive power arranged in the order from the subject side to the image side thereof. When capturing an image with the relay lens 100 in place, incident light rays enter the imaging system 300, transmit through the first lens 10, the second lens 20, the pupil plane 220, and reach the image plane 230.

The first lens 10 has a first subject-side surface 11 facing the subject side of the imaging system 300 and a first image-side surface 12 concave towards the image side of the imaging system 300. The second lens 30 has a second subject-side surface 21 convex towards the subject side of the imaging system 300 and a second image-side surface 22 convex towards the image side of the imaging system 300. The first subject-side surface 11 is a plane. The first lens 10 includes a first principal plane 16 and a second principal 17 arranged from the subject side to the image side thereof, which are two hypothetical planes in a lens at which all the refraction can be considered to happen when the lens is equivalent to a surface of which the thickness is zero. The second lens 20 includes a third principal plane 26 and a fourth principal plane 27 arranged from the subject side to the image side thereof, which are two hypothetical planes in a lens at which all the refraction can be considered to happen when the lens is equivalent to a surface of which the thickness is zero.

The imaging system 300 satisfies a formula (1) $0.53<|f1/f2|<0.57$, where f1 is the effective focal length of the first lens 10, f2 is the effective focal length of the second lens 20. The formula (1) is used for limiting the length of the imaging system 300 to obtain a desirable short overall length of the imaging lens 300 and control coma and lateral chromatic aberrations occurring in the imaging lens 300 within a correctable range. Specifically, when $|f1/f2|<0.57$ is not satisfied, the attempt of shortening the overall length of the imaging system 300 encounters a challenge, on the other hand, when $0.53<|f1/f2|$ is not satisfied, coma and lateral chromatic aberration occurring in the imaging system 300 exceeds the correctable range.

Also, the imaging system 300 further satisfies a formula (2) $1.54<v1/v2<3.11$, where v1 is the Abbe number of the first lens 10, v2 is the Abbe number of the second lens 20. The formula (2) is used for controlling coma and lateral chromatic aberrations occurring in the imaging lens 300 within a correctable range. Specifically, when $v1/v2<3.11$ is not satisfied, the astigmatism occurring in the imaging system 300 exceeds the correctable range, on the other hand, when $1.54<v1/v2$ is not satisfied, the lateral chromatic aberration occurring in the imaging system 300 exceeds the correctable range.

In this embodiment, the imaging system 300 further satisfies a formula (3) $0.22<D1/D2<0.65$, where D1 is the distance between the second principal plane 17 of the first lens 10 and the third principal plane 26 of the second lens 20, D2 is the distance between the fourth principal plane 27 of the second lens 20 and the pupil plane 220. The formula (3) is used for controlling coma and astigmatism occurring in the imaging lens 300 within a correctable range. Specifically, when $D1/D2<0.65$ is not satisfied, the coma occurring in the imaging system 300 exceeds the correctable range, on the other hand, when $0.22<D1/D2$ is not satisfied, the astigmatism occurring in the imaging system 300 exceeds the correctable range.

Additionally, the imaging system 300 further satisfies a formula (4) $-1.18<(R21+R22)/(R21-R22)<0.62$, where R21 is the curvature radius of the second subject-side surface 21 of the second lens 20, R22 is the curvature radius of the second image-side surface 22 of the second lens 20. The formula (4) is used for controlling astigmatism and lateral chromatic aberration occurring in the imaging lens 300 within a correctable range. Specifically, when $(R21+R22)/(R21-R22)<0.62$ is not satisfied, the astigmatism occurring in the imaging system 300 exceeds the correctable range, on the other hand, when $-1.18<(R21+R22)/(R21-R22)$ is not satisfied, the lateral chromatic aberration occurring in the imaging system 300 exceeds the correctable range.

The following symbols are used in the embodiments:

R: radius of curvature;

D: distance between surfaces on the optical axis of the imaging system 300;

Nd: refractive index of lens of d light (wavelength: 587.6 nm); and

Vd: Abbe number of d light (wavelength: 587.6 nm).

A first embodiment of the imaging system 300 satisfies the tables 1, and f3=4.1 mm, f4=2.25 mm, the zoom ratio of the relay lens 100 is f4/f3=0.55X, f1=−18.91 mm, f2=34.051 mm, |f1/f2|=0.555, D1=15.5 mm, D2=3.33 mm, D2/D1=0.215, v1/v2=3.11, (R21+R22)/(R21−R22)=0.618.

TABLE 1

| Surface | R(mm) | D(mm) | Nd | Vd |
|---|---|---|---|---|
| First subject-side surface 11 | infinity | 1 | 1.49 | 81.8 |
| First image-side surface 12 | 9.19 | 14.82 | — | — |
| Second subject-side surface 21 | 139.2 | 1.5 | 1.78 | 26.3 |
| Second image-side surface 22 | −32.91 | 3.17 | — | — |
| Pupil surface 220 | infinity | 4.1 | — | — |
| Image plane 230 | infinity | — | — | — |

Figure 2:
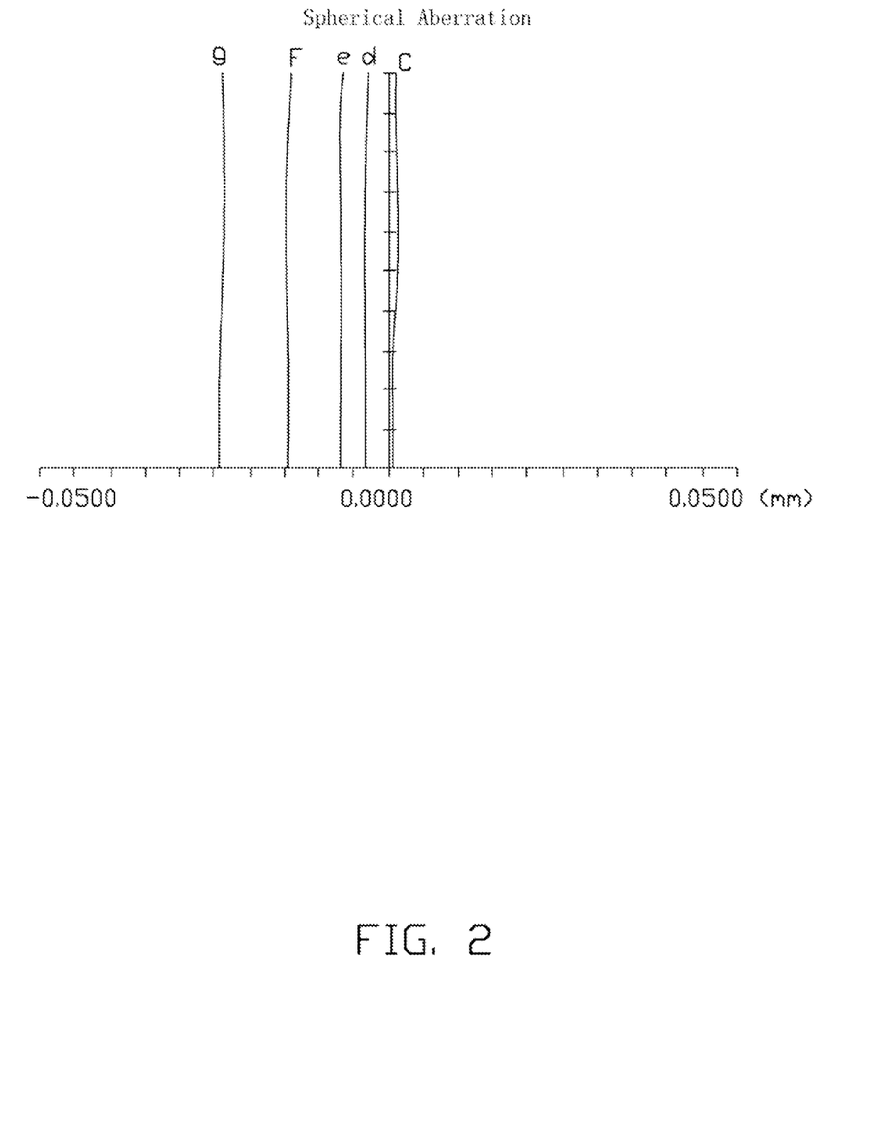
FIGS. 2-4 are graphs respectively showing spherical aberration, field curvature, and distortion in the imaging system of FIG. 1 in accordance with a first embodiment.
Figure 3:
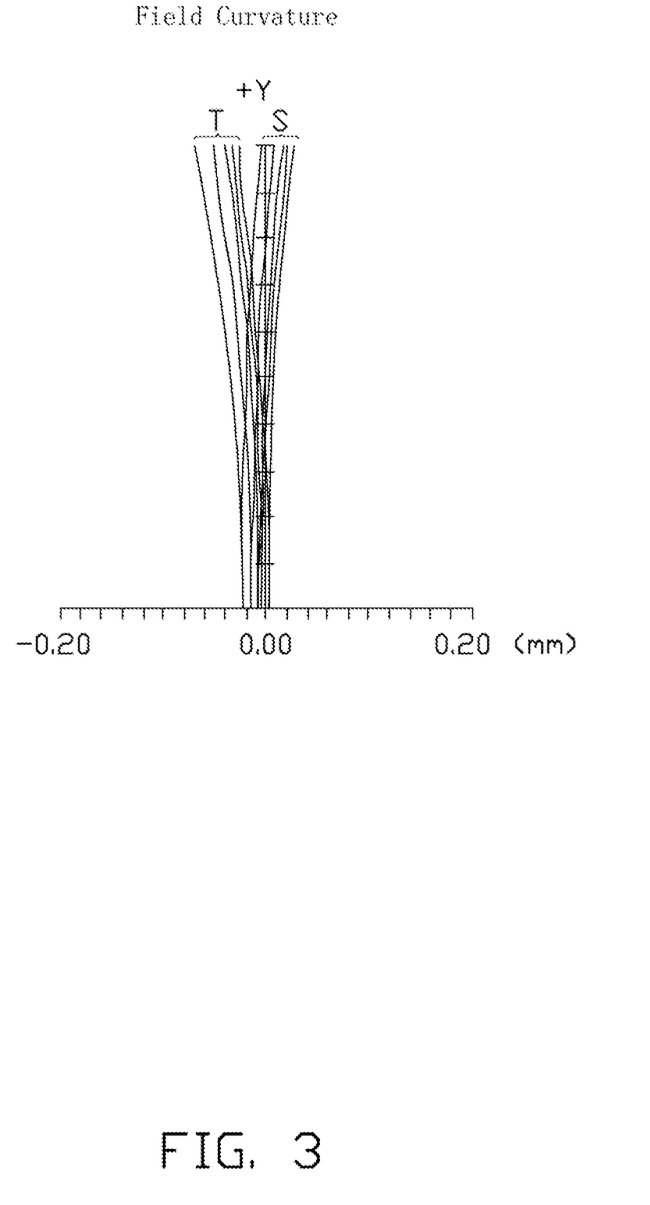
Figure 4:
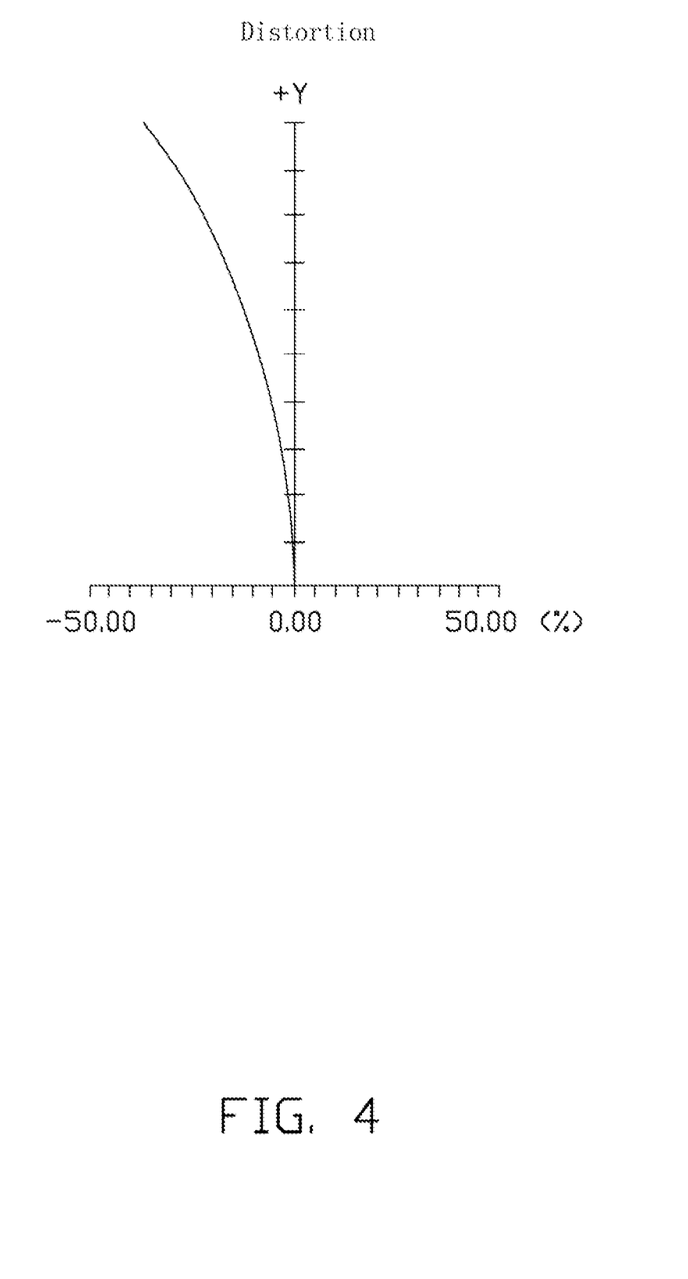

As illustrated in FIG. 2, the curves g, F, e, and d are respective spherical aberration characteristic curves of g light (wavelength: 435.8 nm), F light (wavelength: 486.1 nm), e light (wavelength: 546.1 nm), d light (wavelength: 587.6 nm) occurring in the first embodiment. Obviously, spherical aberration of visible light (400-700 nm) occurring in the first embodiment is in a range of: −0.05 mm~0.05 mm. In FIG. 3, the curves T and S are the tangential field curvature curve and the sagittal field curvature curve, respectively. Clearly, field curvature occurring in the first embodiment is limited to a range of: −0.2 mm~0.2 mm. In FIG. 4, distortion occurring in the first embodiment is limited within the range of: −50%~50%.

A second embodiment of the imaging system 300 is essentially similar to the first embodiment but satisfies tables 2 instead of tables 1, and f3=4.1 mm, f4=2.23 mm, the zoom ratio of the relay lens 100 is f4/f3=0.54X; f1=−13.559 mm; f2=24.882 mm; |f1/f2|=0.545; D1=11.387 mm; D2=7.436 mm; D2/D1=0.653; v1/v2=1.548; (R21+R22)/(R21−R22)=−0.07.

TABLE 2

| Surface | R(mm) | D(mm) | Nd | Vd |
|---|---|---|---|---|
| First subject-side surface 11 | infinity | 1 | 1.91 | 35.3 |
| First image-side surface 12 | 12.35 | 11 | — | — |
| Second subject-side surface 21 | 37.27 | 1.5 | 1.81 | 22.8 |
| Second image-side surface 22 | −42.88 | 6.99 | — | — |
| Pupil surface 220 | infinity | 4.1 | — | — |
| Image plane 230 | infinity | — | — | — |

Figure 5:
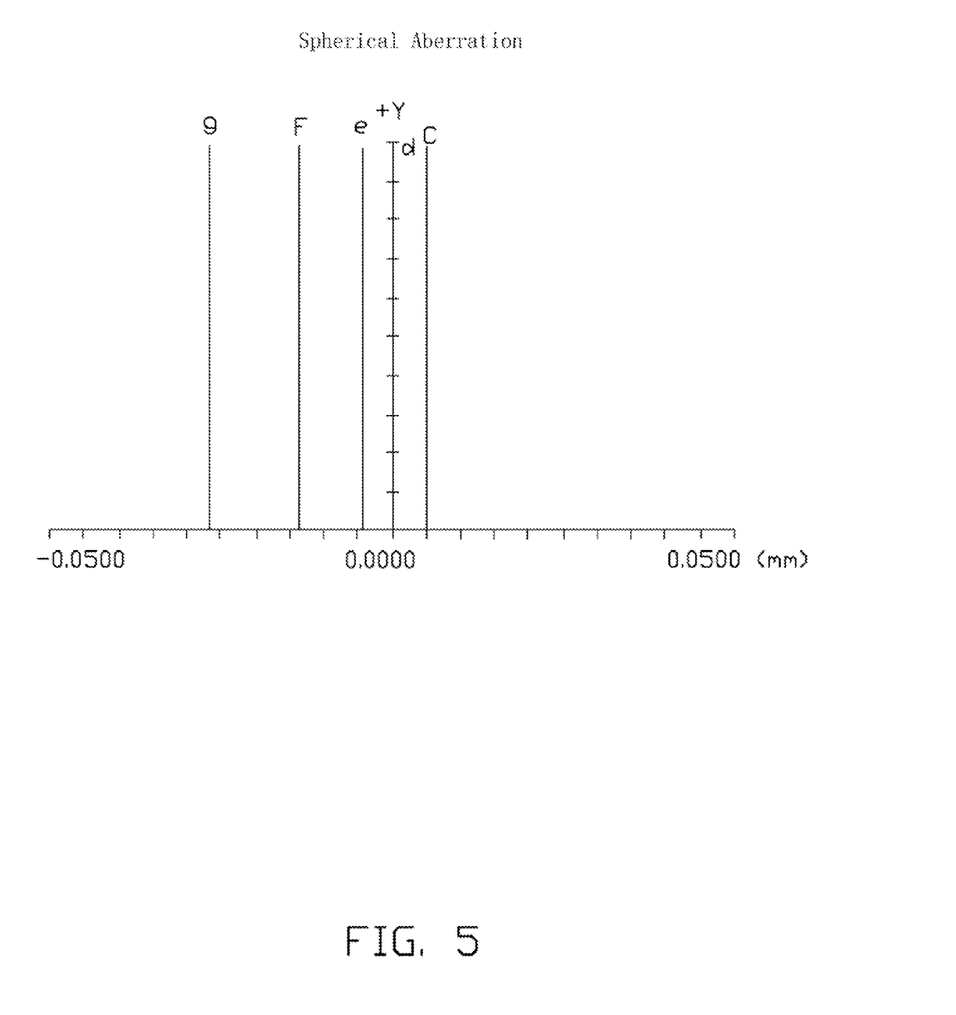
FIG. 5-7 is are graphs respectively showing spherical aberration, field curvature, and distortion in the imaging system of FIG. 1 in accordance with a second embodiment.
Figure 6:
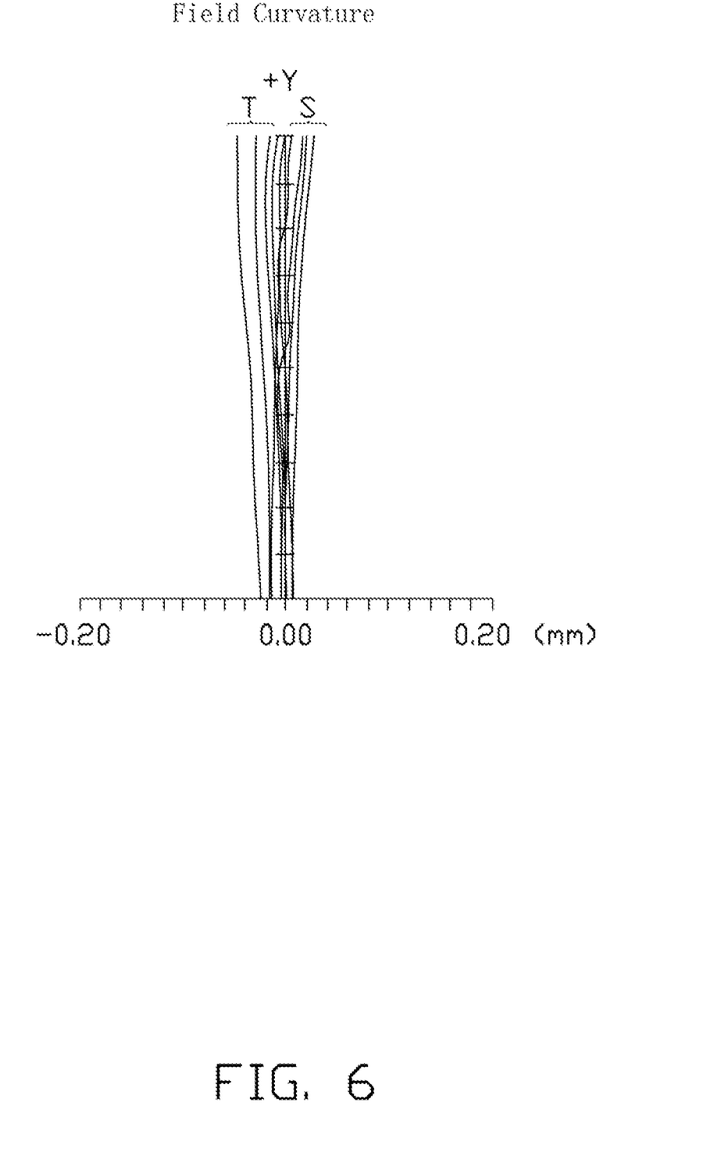
Figure 7:
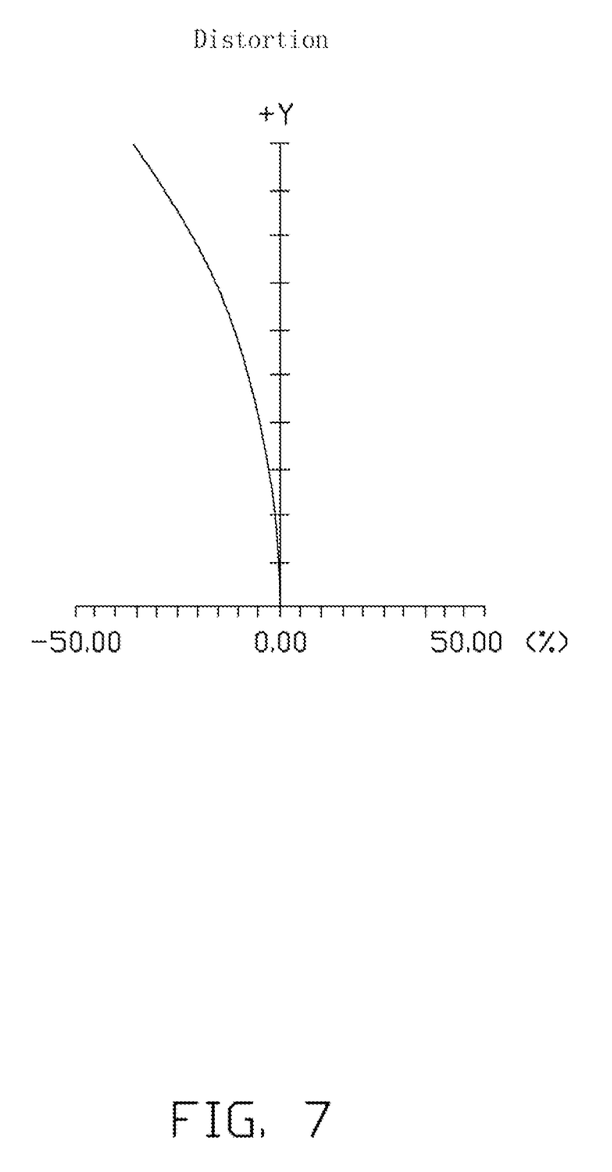

As illustrated in FIG. 5, spherical aberration of visible light (400-700 nm) occurring in the second embodiment is in a range of: −0.05 mm~0.05 mm. In FIG. 6, field curvature occurring in the second embodiment is limited to a range of: −0.2 mm~0.2 mm. In FIG. 7, distortion occurring in the second embodiment is limited within the range of: −50%~50%.

A third embodiment of the imaging system 300 is essentially similar to the first embodiment but satisfies tables 3 instead of tables 1, and f3=4.1 mm, f4=2.26 mm, the zoom ratio of the relay lens 100 is f4/f3=0.55; f1=−17.41 mm; f2=31.348 mm; |f1/f2|=0.555; D1=14.125 mm; D2=4.69 mm; D2/D1=0.332; v1/v2=2.21; (R21+R22)/(R21−R22)=−1.18.

TABLE 3

| Surface | R(mm) | D(mm) | Nd | Vd |
|---|---|---|---|---|
| First subject-side surface 11 | infinity | 1 | 1.7 | 56.4 |
| First image-side surface 12 | 12.13 | 14.2 | — | — |
| Second subject-side surface 21 | 23.21 | 1.5 | 1.81 | 25.5 |
| Second image-side surface 22 | 280.16 | 3.79 | — | — |

TABLE 3-continued

| Surface | R(mm) | D(mm) | Nd | Vd |
|---|---|---|---|---|
| Pupil surface 220 | infinity | 4.1 | — | — |
| Image plane 230 | infinity | — | — | — |

Figure 8:
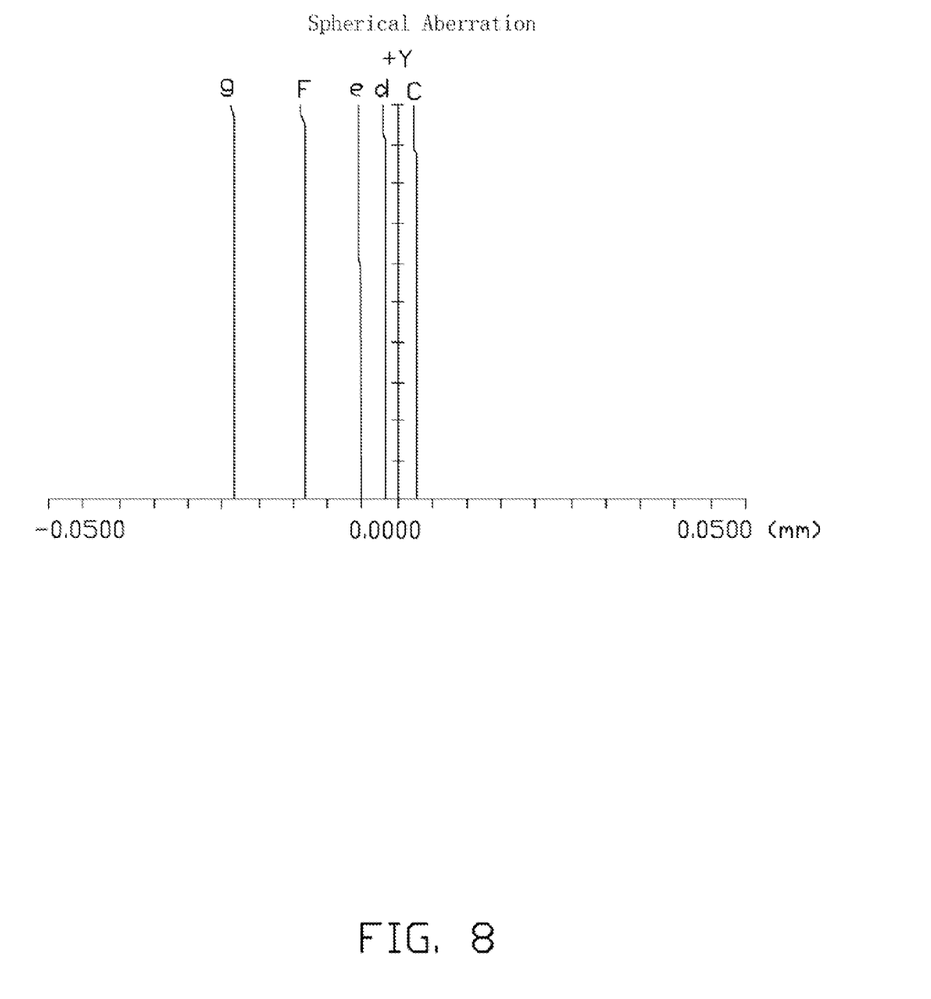
FIG. 8-10 is are graphs respectively showing spherical aberration, field curvature, and distortion in the imaging system of FIG. 1 in accordance with a third embodiment.
Figure 9:
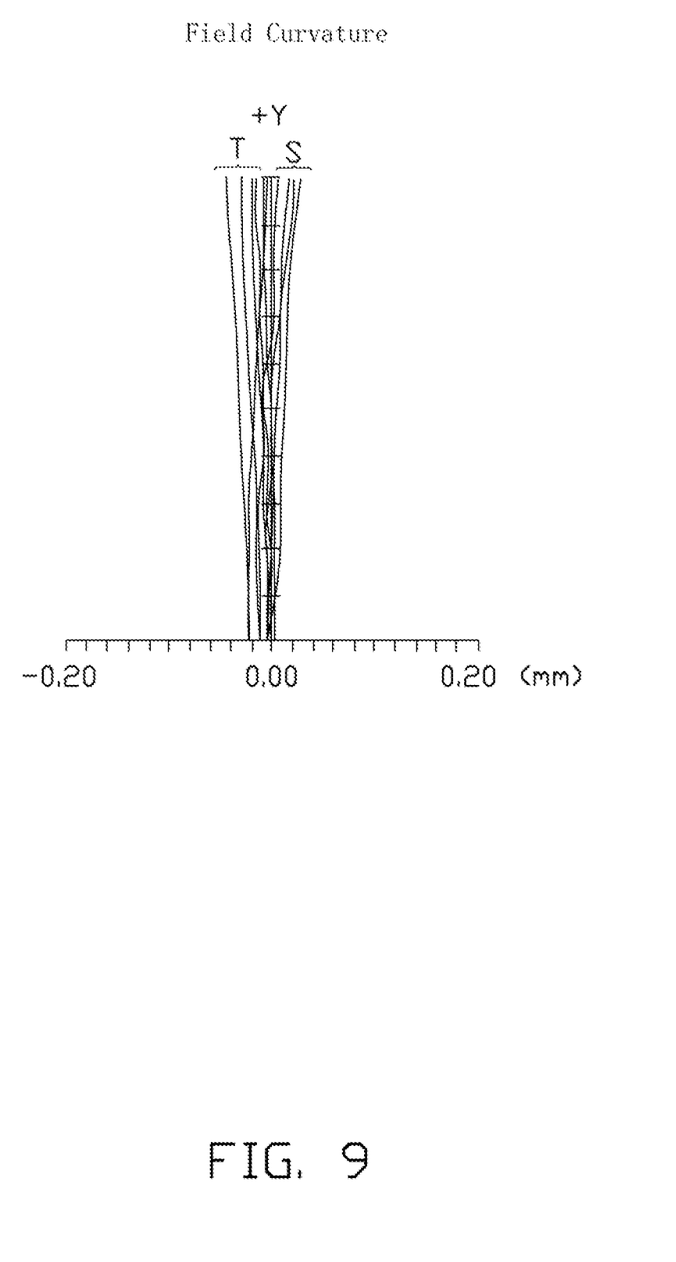
Figure 10:
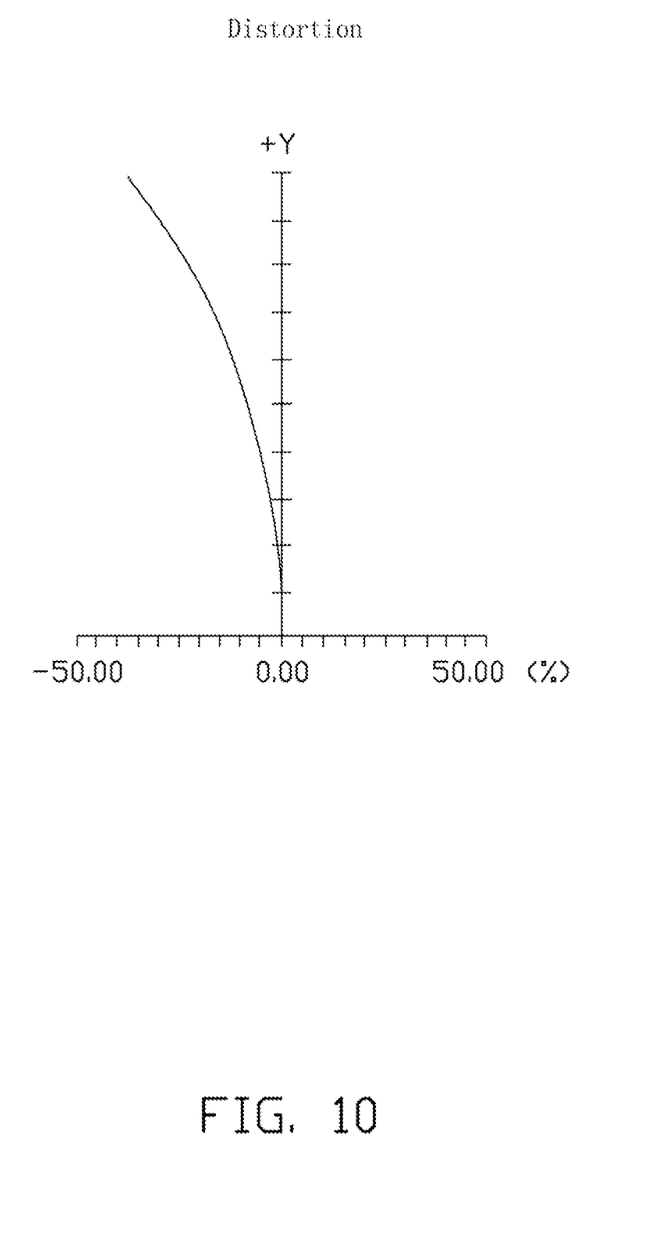

As illustrated in FIG. 8, spherical aberration of visible light (400-700 nm) occurring in the third embodiment is in a range of: −0.05 mm~0.05 mm. In FIG. 9, field curvature occurring in the third embodiment is limited to a range of: −0.2 mm~0.2 mm. In FIG. 10, distortion occurring in the third embodiment is limited within the range of: −50%~50%.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the scope of the disclosure but do not restrict the scope of the disclosure.

What is claimed is:

1. A relay lens for an imaging system having a main lens, the main lens having a pupil plane, the relay lens, in the order from the subject side to the image side thereof, comprising:
    a first lens of negative refractive power, wherein the first lens has a first subject-side surface facing the subject side of the imaging system and a first image-side surface concave towards the image side of the imaging system, the first subject-side surface is a plane; and
    a second lens of positive refractive power, wherein the second lens has a second subject-side surface convex towards the subject side of the imaging system and a second image-side surface convex towards the image side of the imaging system;
    wherein, the first lens comprises a first principal plane and a second principal plane from the subject side to the image side thereof; the second lens comprises a third principal plane and a fourth principal plane from the subject side to the image side thereof;
    wherein, the relay lens satisfies the following formulas: 0.53<|f1/f2|<0.57; 1.54<v1/v2<3.11; 0.22<D1/D2<0.65, wherein f1 is the effective focal length of the first lens, f2 is the effective focal length of the second lens, v1 is the Abbe number of the first lens, v2 is the Abbe number of the second lens, D1 is the distance between the second principal plane of the first lens and the third principal plane of the second lens, D2 is the distance between the fourth principal plane of the second lens and the pupil plane.

2. The relay lens of claim 1, further satisfying the following formula: −1.18<(R21+R22)/(R21−R22)<0.62, where R21 is the curvature radius of the second subject-side surface of the second lens, R22 is the curvature radius of the second image-side surface of the second lens.

3. An imaging system comprises:
    a main lens comprising a pupil plane; and
    a relay lens positioned on the subject side of the main lens and aligned with the main lens, the relay lens, in the order from the subject side to the image side thereof, comprising:
    a first lens of negative refractive power, wherein the first lens has a first subject-side surface facing the subject side of the imaging system and a first image-side surface concave towards the image side of the imaging system, the first subject-side surface is a plane; and a second lens of positive refractive power, wherein the second lens has a second subject-side surface convex towards the subject side of the imaging system and a second image-side surface convex towards the image side of the imaging system;

wherein, the first lens comprises a first principal plane and a second principal plane from the subject side to the image side thereof; the second lens comprises a third principal plane and a fourth principal plane from the subject side to the image side thereof;

wherein, the relay lens satisfies the following formulas; $0.53<|f1/f2|<0.57$; $1.54<v1/v2<3.11$; $0.22<D1/D2<0.65$, where f1 is the effective focal length of the first lens, f2 is the effective focal length of the second lens, v1 is the Abbe number of the first lens, v2 is the Abbe number of the second lens, D1 is the distance between the second principal plane of the first lens and the third principal plane of the second lens, D2 is the distance between the fourth principal plane of the second lens and the pupil plane.

4. The relay lens of claim 3, further satisfying the following formula: $-1.18<(R21+R22)/(R21-R22)<0.62$, where R21 is the curvature radius of the second subject-side surface of the second lens, R22 is the curvature radius of the second image-side surface of the second lens.

\* \* \* \* \*